J. C. HARRIS.
CAR FENDER.
APPLICATION FILED MAY 4, 1914.
1,133,136.
Patented Mar. 23, 1915.
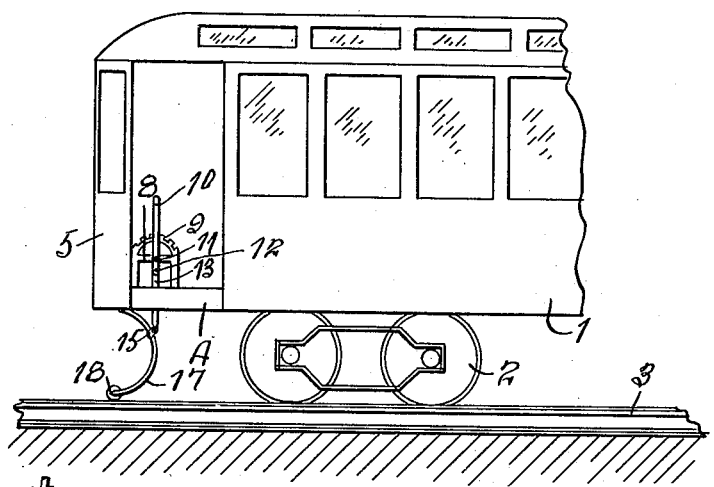
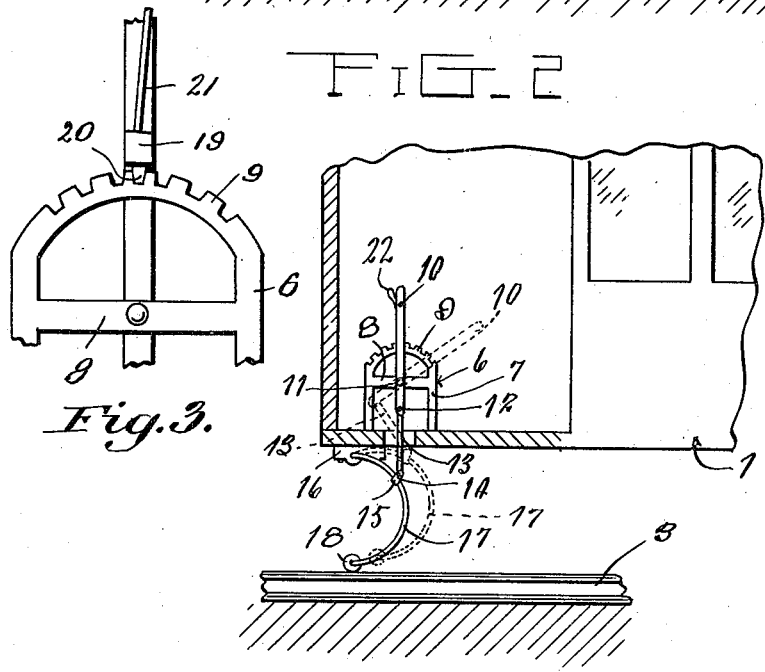
Witnesses
Chas. H. Trotter
Inventor
J. C. Harris

UNITED STATES PATENT OFFICE.

JAMES C. HARRIS, OF CAMBRIDGE, KANSAS.

CAR-FENDER.

1,133,136.  Specification of Letters Patent.  Patented Mar. 23, 1915.

Application filed May 4, 1914.  Serial No. 836,252.

*To all whom it may concern:*

Be it known that I, JAMES C. HARRIS, a citizen of the United States, residing at Cambridge, in the county of Cowley and State of Kansas, have invented certain new and useful Improvements in Car-Fenders, of which the following is a specification.

This invention relates to new and useful improvements in car fenders, and has for its principal object to provide a fender which may be raised and lowered from contact with the car track.

Another object of the invention is to provide a fender which may be controlled from the platform of a car by a lever or other device which is located within easy reach of the motorman or driver.

A further object of the invention is to provide a simple and effective device by means of which a person on the track will be prevented from becoming entangled in the running gear of the car and many accidents will be eliminated.

With these and other objects in view, the invention consists in the novel combination and arrangement of parts which will be fully set forth in the following specification and accompanying drawings, in which, Figure 1 is a side view of a fragment of a car showing the attachment as it would appear when in place with the fender lowered, and Fig. 2 is a fragmentary view of a car showing the fender in place and clearly illustrating the detail construction. Fig. 3 is an enlarged detail fragmentary view showing the rack bar locking device in detail provided on the side of the lever opposite to that illustrated in Figs. 1 and 2.

Referring now to the drawings by characters of reference, the numeral 1 designates as an entirety the car body having the usual truck carrying the wheels 2 thereon. The ordinary railroad track is designated by the numeral 3 and is formed by the rails and ties in the ordinary way. The car platform is designated by the numeral 4 and is provided with the dash 5 which is closed at its upper terminal to form the usual vestibule. Secured to the car platform 4 is a suitable framework designated generally by the numeral 6, which comprises the uprights 7 which are connected near their upper terminals with the transverse bar 8. A suitable segmental rack bar 9 is formed at the upper terminal of the post 7 and is arranged to coöperate with a suitable lever locking mechanism. This locking mechanism comprises the housing 19 fixed on the lever 10 in which the dog 20 is slidable, and this dog 20 is connected in any suitable manner to the connecting rod 21 which is operatively connected at its upper end to the grip 22 by which the operation of the dog is controlled. The lever above mentioned is designated by the numeral 10, and is pivotally mounted, as at 11, to the cross bar 8, hereinbefore described. Suitably connected, as at 12, to the lower terminal of the lever 10 is the link 13, the free end of which is pivotally connected, as at 14, to the sleeve 15, which is connected to the fender and is arranged to operate the same. A similar support 16 is secured to the platform of the car near its forward terminal and is arranged to pivotally hold the fender 17 to the car. A suitable roller 18 is carried by the free end of the fender 17 and is arranged to engage the track when the device is in use. This fender 17 comprises a pair of curved end bars 18 which are connected at their terminals by suitable transversely extending bars. These bars extend through the supports 16, hereinbefore referred to, and thus pivotally hold the fender, designated by the numeral 17, in place.

It will be evident from the foregoing that, in use, the fender is normally carried in the position illustrated by the dotted lines in Fig. 2, and when the car operator becomes aware of danger, the lever 10 is drawn into the position illustrated in Fig. 1, which will cause the fender to swing downwardly, as shown, and thereby bring the roller 18 into contact with the rails 3. In this position, should the car contact with an object on the track, it will be apparent that said object will be prevented from becoming entangled in the running gear of the car through the medium of the fender, and thus accidents will be eliminated.

While in the foregoing there has been shown and described the preferred embodiment of this invention, it is to be understood that such changes may be made in the combination and arrangement of parts as will fall within the spirit and scope of the invention as defined in the appended claim.

Having thus described my invention, I claim:

The combination with a car platform of a frame comprising a pair of uprights, a transverse bar connecting the uprights near their upper terminals, a segment formed at the upper terminals of the uprights, a lever pivotally connected to the transverse bar, means carried by the lever to coöperate with the segment in holding the lever in adjusted position, a fender comprising a pair of curved end bars, a pair of transversely extending bars connecting the end bars at their terminals, means to pivotally secure the fender to the car platform, and a link connected to the lever and to one of the curved end bars, said link being connected intermediate the ends of the end bar so that when upward pull is exerted thereon, the fender will be swung clear of the track.

In testimony whereof I affix my signature in presence of two witnesses.

JAMES C. HARRIS.

Witnesses:
O. E. MUSGROVE,
G. H. DWYER.

Copies of this patent may be obtained for five cents each, by addressing the "Commissioner of Patents, Washington, D. C."